US012356888B2

(12) United States Patent
Hoffman et al.

(10) Patent No.: US 12,356,888 B2
(45) Date of Patent: Jul. 15, 2025

(54) DUAL FUNCTION POWER TOOL

(71) Applicant: TECHTRONIC CORDLESS GP, Anderson, SC (US)

(72) Inventors: Ronald J. Hoffman, Iva, SC (US); Eric J. Nolin, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 837 days.

(21) Appl. No.: 17/589,965

(22) Filed: Feb. 1, 2022

(65) Prior Publication Data

US 2022/0240445 A1 Aug. 4, 2022

Related U.S. Application Data

(60) Provisional application No. 63/145,272, filed on Feb. 3, 2021.

(51) Int. Cl.

| | |
|---|---|
| ***A01D 34/73*** | (2006.01) |
| ***A01D 34/81*** | (2006.01) |
| ***A01D 34/82*** | (2006.01) |
| ***A01D 34/90*** | (2006.01) |
| *A01D 101/00* | (2006.01) |

(52) U.S. Cl.

CPC ......... *A01D 34/733* (2013.01); *A01D 34/736* (2013.01); *A01D 34/81* (2013.01); *A01D 34/82* (2013.01); *A01D 34/90* (2013.01); *A01D 2101/00* (2013.01)

(58) Field of Classification Search

CPC .... A01D 34/733; A01D 34/90; A01D 34/736; A01D 34/81–82

See application file for complete search history.

(56) References Cited

U.S. PATENT DOCUMENTS 4,114,354 A * 9/1978 Morris ................. A01D 34/736 56/295
4,161,820 A 7/1979 Moore
4,715,173 A * 12/1987 Anderson ............ A01D 34/733 56/DIG. 9
D299,484 S 1/1989 Lee
(Continued)

FOREIGN PATENT DOCUMENTS

CN 202697258 U 1/2013
CN 102946711 A 2/2013
(Continued)

OTHER PUBLICATIONS

European Search Report Corresponding with Application No. EP22152427 on Jun. 3, 2022 (2 pages).
(Continued)

*Primary Examiner* — Sean M Michalski
(74) *Attorney, Agent, or Firm* — Dority & Manning, P.A.

(57) ABSTRACT

A dual function tool head including a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

20 Claims, 5 Drawing Sheets

(56) References Cited

U.S. PATENT DOCUMENTS

| | | | | | |
|---|---|---|---|---|---|
| 5,167,109 | A * | 12/1992 | Meinerding | A01D 34/005 56/DIG. 17 |
| 5,291,725 | A * | 3/1994 | Meinerding | A01D 34/005 56/255 |
| 5,617,636 | A * | 4/1997 | Taggett | A01D 34/736 30/276 |
| 5,649,413 | A | 7/1997 | Oostendorp | |
| 6,460,253 | B1 | 10/2002 | Wheeler | |
| 6,817,102 | B2 * | 11/2004 | Harris | A01D 34/733 30/348 |
| 8,667,695 | B2 * | 3/2014 | Yamaoka | A01D 34/736 30/329 |
| 10,149,434 | B2 | 12/2018 | Martinsson | |
| 10,264,725 | B2 | 4/2019 | Guo | |
| 10,440,882 | B2 | 10/2019 | Guo | |
| 11,856,885 | B1 * | 1/2024 | Olin | A01D 34/68 |
| 2001/0027610 | A1 | 10/2001 | Wheeler | |
| 2010/0313430 | A1 | 12/2010 | Yamaoka | |
| 2010/0326032 | A1 | 12/2010 | Leonardi | |
| 2012/0318114 | A1 * | 12/2012 | Esain Eugui | A01D 45/10 83/651 |
| 2013/0133208 | A1 | 5/2013 | Skinner | |
| 2016/0302355 | A1 | 10/2016 | Martinsson | |
| 2018/0153099 | A1 * | 6/2018 | Hwang | A01D 34/733 |
| 2018/0295775 | A1 | 10/2018 | Kang | |

FOREIGN PATENT DOCUMENTS

| | | | |
|---|---|---|---|
| CN | 103875351 | B | 6/2014 |
| CN | 204377423 | U | 6/2015 |
| CN | 106818028 | B | 6/2017 |
| CN | 206389775 | U | 8/2017 |
| CN | 207665487 | U | 7/2018 |
| CN | 108684301 | A | 10/2018 |
| CN | 109220164 | A | 1/2019 |
| CN | 208624120 | U | 3/2019 |
| CN | 111480446 | A | 8/2020 |
| DE | 202017003593 | U1 | 9/2017 |
| DE | 202018004027 | U1 | 10/2018 |
| EP | 1056327 | B1 | 12/2000 |
| EP | 1364571 | A1 | 11/2003 |
| EP | 2451264 | B1 | 5/2012 |
| KR | 101583805 | B1 | 1/2016 |
| WO | WO2015133739 | A1 | 9/2015 |
| WO | WO2020135750 | A1 | 7/2020 |

OTHER PUBLICATIONS

Chinese Office Action Corresponding with Application No. 202210099000.6 on Apr. 23, 2023 (3 pages).

* cited by examiner

DUAL FUNCTION POWER TOOL

FIELD

The present subject matter relates generally to dual function power tools, and more particularly to power tools having dual functioning tool heads for dual purpose, e.g., cutting and trimming, operations.

BACKGROUND

Power tools are generally utilized for activities like yard maintenance. Prior to the use of power tools, operators maintained outdoor environments using hand powered implements. Gas-powered power tools later entered the market and allowed operators to more easily maintain outdoor environments. However, these gas-powered tools require fuel and can demand oil mixtures along with significant upkeep. Additionally, gas-powered tools operate at high decibels which can disturb neighborhoods and require the use of ear protection. Electric motors are used to replace traditional gas-powered engines.

With the advent of electric power tools, homeowners and contractors performing maintenance on outdoor environments, e.g., yard maintenance, are often required to maintain a fleet of different power tools each having a different functional purpose. For example, a homeowner may utilize such equipment as a lawn mower, a hedge trimmer, a grass trimmer, a brush cutter, a leaf blower, and the like. Such a large fleet of products costs the operator additional money and requires large areas of storage and significant upkeep. Therefore, it would be desirable to reduce the number of tools required for a given project.

BRIEF DESCRIPTION

Aspects and advantages of the invention in accordance with the present disclosure will be set forth in part in the following description, or may be obvious from the description, or may be learned through practice of the technology.

In accordance with one embodiment, a dual function tool head is provided. The dual function tool head includes a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

In accordance with another embodiment, a dual function power tool is provided. The dual function power tool includes a handle; an electric motor; a battery configured to provide power to the electric motor; and a dual function tool head rotatably driven by the electric motor, the tool head comprising: a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

In accordance with another embodiment, a method of performing outdoor work is provided. The method includes operating a power tool in a first direction to use a first selectively deployable cutting tool of the power tool; and switching the power tool to rotate in a second direction opposite the first direction, wherein switching the power tool to operate in the second direction causes the first selectively deployable cutting tool to move to a stowed position while generally simultaneously deploying a second selectively deployable cutting tool of the power tool.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
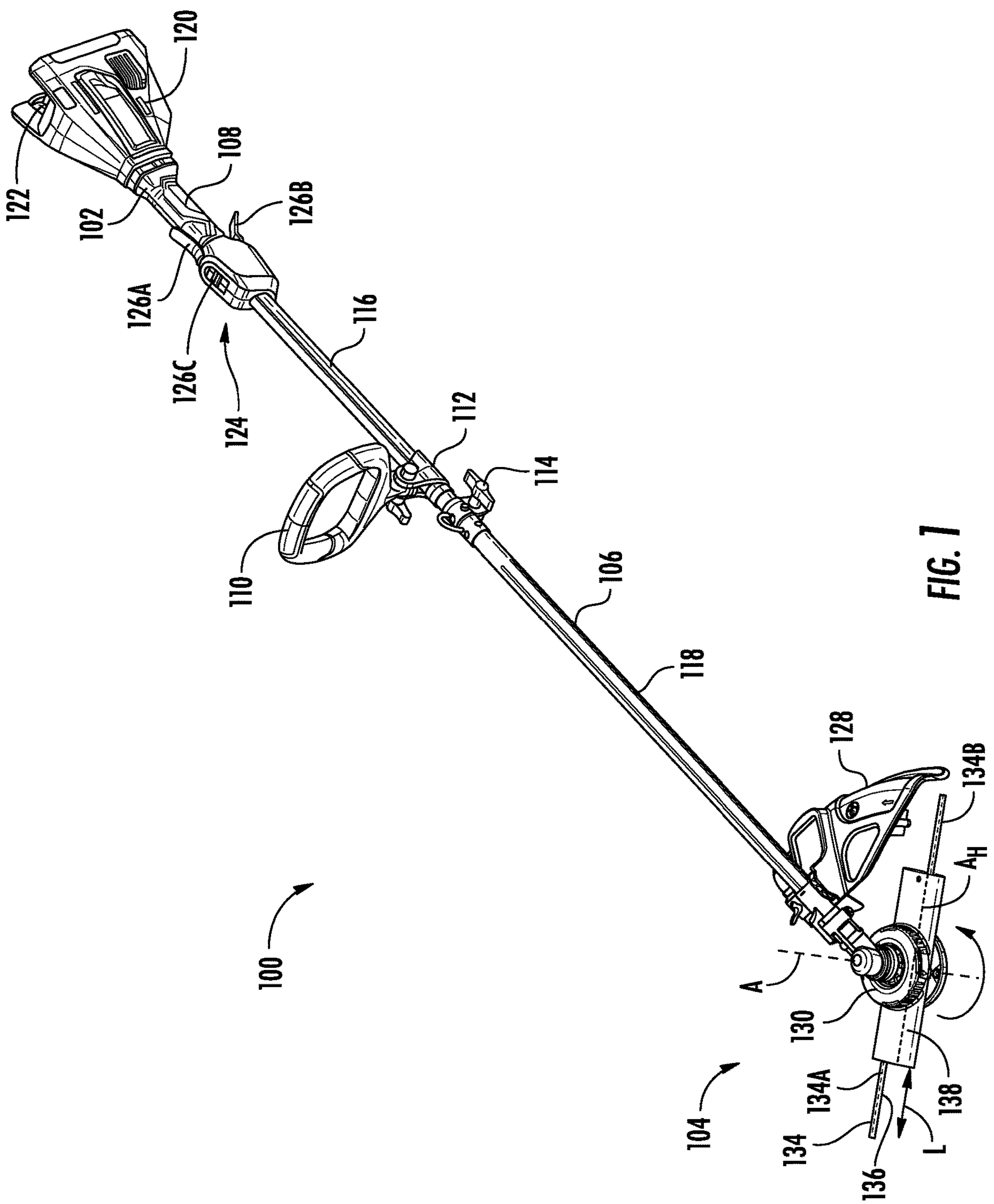
FIG. 1 is a perspective view of a power tool in accordance with an exemplary embodiment of the present disclosure.

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, a dual function power tool in accordance with embodiments described herein can include a dual functioning tool head having a first selectively deployable cutting tool and a second selectively deployable cutting tool. The first and second selectively deployable cutting tools can be configured to operate at different times of operation. For instance, the first selectively deployable cutting tool can be automatically deployed when the tool head rotates in a first direction while the second selectively deployable cutting tool can be automatically deployed when the tool head rotates in a second direction opposite the first direction. When not in use, the first or second selectively deployable cutting tool can be disposed in a stowed position, allowing the operator to use the other of the first or second selectively deployable cutting tool. In certain instances, the operator can switch between the first and second selectively deployable cutting tools through a user interface. The user interface can include, for example, a switch disposed on a handle of the power tool. The switch can be in electronic communication with a logic device of the power tool which adjusts an aspect, e.g., a rotational orientation of the tool head, so as to cause deployment of the desired selectively deployable cutting tool. It is noted that the first and second selectively deployable cutting tools can be different from one another. For example, the first selectively deployable cutting tool can include trimmer line that can be used to trim grass and the like, while the second selectively deployable cutting tool can include a blade that can be used to cut brush and the like.

Figure 2:
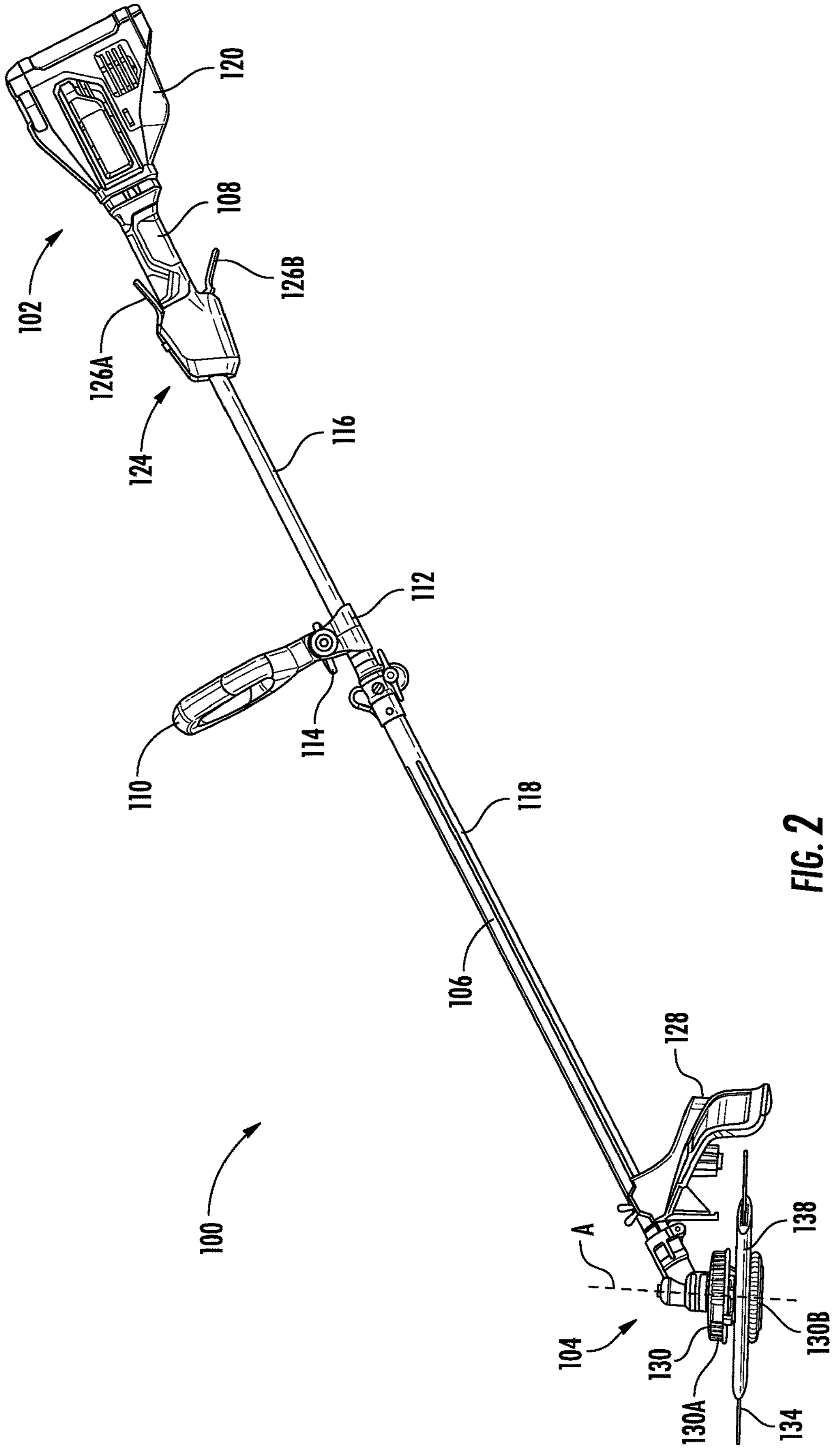
FIG. 2 is a side view of the power tool in accordance with an exemplary embodiment of the present disclosure.

Referring now to the Figures, FIGS. 1 and 2 illustrate views of an exemplary power tool 100 in accordance with an embodiment described herein. The power tool 100 can include a handheld power tool configured to be used by an operator during outdoor maintenance, such as during yardwork. The power tool 100 generally includes a handle 102, a dual function tool head 104 (referred to hereinafter as the head tool) and an elongated member 106 extending between the handle 102 and the head tool 104. As shown in the illustrated embodiment, the handle 102 includes a first interface 108 whereby the operator can hold the power tool 100 with a first hand. A second interface 110 can allow the operator to hold the power tool 100 with a second hand. While the first and second interfaces 108 and 110 can be disposed at any relative position along the power tool 100, in the illustrated embodiment, the second interface 110 is disposed along the elongated member 106. In an embodiment, at least one of the first and second interfaces 108 and 110 can be repositionable relative to the power tool 100. For instance, in the illustrated embodiment, the second interface 110 can be coupled to the elongated member 106 through an adjustable interface 112. The adjustable interface 112 can permit translation and/or rotation of the second interface 110 with respect to a length and rotational orientation relative to the elongated member 106. Adjustment of the locations and/or orientations of the first and/or second interfaces 108 and 110 may be desirable, for example, when switching between functional operations of the power tool 100. That is, the operator may desire different hand positioning when performing different functions with the power tool 100.

To facilitate different operational positions, the elongated member 106 may define an adjustable (selectively configurable) construction. For instance, the elongated member 106 can include a plurality of sections coupled together through one or more adjustable interfaces, e.g., adjustable interface 114. The adjustable interface 114 can permit translational and/or rotational adjustment of position of the tool head 104 with respect to the handle 102. The adjustable interface 114 depicted in FIGS. 1 and 2 includes an adjustable knob configured to allow the operator to selectively tighten a first portion 116 of the elongated member 106 relative to a second portion 118 thereof. The first and second members 116 and 118 may be telescopically arranged, interconnected by one or more pivotable interfaces, booms and the like. Upon tightening the adjustable interface 114, the operator can fix the relative position of the tool head 104 relative to the handle 102.

The handle 102 can include a body 120 coupled at, or adjacent to, a first longitudinal end of the elongated member 106. The handle 102 can define an internal volume configured to support one or more electrical connections, wires, logic devices, cooling elements, motors, and the like. The handle 102 can further define an electrical interface 122 configured to receive a power source. The power source can include, for example, an electrical plug configured to electrically couple with a power cable. The power source can alternatively include an integrated power cable extending from the handle 102 and configured to be engaged with an outlet, such as a wall outlet, disposed at or near the environment being operated in. In the illustrated embodiment, the electrical interface 122 comprises a receiving area configured to receive a removable battery. The battery may engage with the electrical interface 122 through selective movement between the battery and the handle 102. For instance, the battery may slide into the electrical interface 122. In a particular embodiment, the battery may be insertable into the electrical interface through translational movement in a direction from a top side of the body 120 to a lower side of the body 120. The battery can be engaged with the electrical interface 122 using other relative movements, such as rotation or translation in a same or another direction. In other embodiments, the battery can be integrally built into the handle 102 and configured to have a recharging port whereby the operator can connect the battery to a remote power supply for recharging.

The power tool 100 can further include a user interface 124 configured to operate the power tool 100. More specifically, the user interface 124 can include one or more triggers, such as triggers 126A and 126B. The user interface 124 can be in electronic communication with one or more logic devices of the power tool 100. Through the user interface 124, the operator can selectively adjust between two or more operational modes of the power tool 100 described hereinafter.

By way of example, the triggers 126A and 126B can include a safety trigger (sometimes referred to as a dead man's trigger) configured to disallow operation of the power tool 100 when not actively depressed, and a throttle or power trigger configured to provide power to the tool head 104 upon being depressed by the operator. Another portion of the user interface 124 can include a toggle 126C configured to allow the operator to select between the aforementioned two or more operational modes of the power tool 100. In the illustrated embodiment, the triggers 126A and 126B are configured to operate through pivotal motion while the toggle 126C is translatable between at least first and second positions. In the first position, the power tool 100 may operate in a first operational mode. In the second position, the power tool 100 may operate in a second operational mode different from the first operational mode. The toggle 126C may be further actuatable to one or more additional positions, such as a third position whereby the power tool 100 operates in a third operational mode different from the first and second operational modes. By way of example, the first operational mode can correspond with a trimming operation while the second operational mode can correspond with a brush cutting mode. In an embodiment, the third operational mode can correspond with a neutral, e.g., non-engaged, mode whereby rotation of the tool head 104 is prohibited.

During use, the triggers 126A and 126B can be controlled by a palm of the operator while the toggle 126C is controllable by a finger, e.g., the thumb, of the operator. In certain instances, the toggle 126C may be switchable between operational modes only when at least one of the triggers 126A and 126B is not actively depressed. In such a manner, selective adjustment between the operational modes can occur only when the tool head 104 is not actively in use. In other instances, the toggle 126C may be switchable between operational modes while the triggers 126A and 126B are actively depressed. The toggle 126C can include an indicator to indicate to the operator of successful switching between the operational modes. The indicator can include, for example, tactile indication, visual indication, audible indication, or any combination thereof. Indicia can be included on or at the toggle 126C such that the operator can determine which position of the toggle 126C corresponds with each operational mode of the power tool 100.

The tool head 104 can be disposed at a second longitudinal end of the elongated member 106. In an embodiment, the tool head 104 can be dynamically coupled to the elongated member 106 such that the operator can adjust the relative position and/or orientation thereof with respect to the elongated member 106, and more particularly, with respect to the handle 102. By way of example, the tool head 104 can be pivotable relative to the elongated member 106, extendable relative to the elongated member 106, and the like. A guard 128 can be disposed around at least a portion of the tool head 104. In certain instances, the guard 128 can be disposed at a rear position of the tool head 104 such that the guard 128 protects the operator from flying debris generated by the tool head 104.

The tool head 104 can include a rotatable body 130 which can be driven by a motor (not shown) of the power tool 100. The motor can include, for example, an electric motor electrically coupled with the aforementioned battery. The motor can be positioned in the handle 102, the tool head 104, or the elongated member 106. A shaft (not shown) may extend between the motor and the rotatable body 130 so as to drive the rotatable body 130. The rotatable body 130 may define an axis of rotation A. In certain instances, the axis of rotation A can remain relatively fixed relative to the handle 102 during operation of the power tool 100. In certain instances, the rotatable body 130 can rotate about the axis of rotation A at one or more preset (i.e., fixed) velocities. In other instances, the rotatable body 130 can rotate about the axis of rotation A at variable velocities as indicated by the user interface 124, e.g., the relative position of at least one of the triggers 126A and 126B. That is, rotation of the rotatable body 130 may occur within a scope of velocities defined by a predefined, e.g., minimum and maximum, velocity range.

The rotatable body 130 can be configured to rotate about the axis of rotation A in both a first rotational direction and a second rotational direction opposite the first rotational direction. The first rotational direction can include, for example, a clockwise rotational orientation and the second rotational direction can include, for example, a counterclockwise rotational orientation. The direction of rotational orientation may be set, for example, by the toggle 126C. That is, in the first operational mode the rotatable body 130 may rotate in the first rotational direction. Conversely, when in the second operational mode, the rotational body 130 may rotate in the second rotational direction.

In an embodiment, the maximum velocity of the rotatable body 130 in the first and second rotational directions can be generally the same as one another. In such a manner, the rotatable body 130 can rotate within a velocity range equal to two times the maximum velocity in either rotational direction. In another embodiment, the maximum velocity of the rotatable body 130 in the first rotational direction can be different than the maximum velocity of the rotatable body 130 in the second rotational direction. By way of example, the maximum velocity, $V_{MAX1}$, of the rotatable body 130 in the first rotational direction can be +/−1 revolution per minute (RPM) relative to the maximum velocity, $V_{MAX2}$, of the rotatable body 130 in the second rotational direction, such as +/−5 RPMs, such as +/−20 RPMs, such as +/−50 RPMs, such as +/−100 RPMs, such as +/−250 RPMs, such as +/−500 RPMs, such as +/−1000 RPMs, such as +/−2500 RPMs, such as +/−5000 RPMs. Different maximum velocities in the first and second directions may be particularly useful in embodiments where the cutting operation to be performed in the first direction is different than the cutting operation to be performed in the second direction. For instance, the power tool 100 may include dual functionality to permit the operator to trim grass in the first direction and cut brush in the second direction. Grass trimming operations may require higher RPMs to achieve optical cutting efficiency as compared to brush cutting operations. The rotational velocity in the grass trimming orientation may thus be controlled so as to have a higher maximum RPM than when cutting brush.

In an embodiment, the power tool 100 may define different operational parameters when switching between grass trimming and brush cutting operations. For instance, torque overload control may be present when brush cutting but not present when grass trimming. Or torque overload control parameters may be different between the two operations. Other exemplary operational parameters which may be different in the different modes include acceleration rates, motor torque values, stall speeds, emergency shut-off values, motor control values (e.g., voltage and current), and the like.

In one or more embodiments, switching between the first and second rotational directions can occur through reversing the direction of motor operation. That is, the direction of rotation of the motor can be reversed to switch between the first and second rotational directions. In one or more other embodiments, the power tool 100 can include a transmission assembly, or the like, configured to transmit unidirectional rotational motion of the motor as bi-directional rotation of the rotatable body 130, selectively adjustable based on the selection at the user interface 124.

The tool head 104 can further include a cutting implement including a first selectively deployable cutting tool 132 (FIG. 3) and a second selectively deployable cutting tool 134 (FIGS. 1 and 2). The first and second selectively deployable cutting tools 132 and 134 can include different types of cutting tools. As previously described, the power tool 100 can be configured to cut in different operational modes. The type of cutting tools selected for the first and second selectively deployable cutting tools 132 and 134 can accordingly depend on the operation to be performed in the different operational modes. By way of example, the first selectively deployable cutting tool 132 can include trimmer line configured to trim grass, while the second selectively deployable cutting tool 134 includes a blade configured to cut brush. While the trimmer line can be flexible and configured to hold radially extending tension during rotation of the rotatable body 130, the blade can include a relatively rigid body having one or more sharpened surfaces for cutting brush.

In an embodiment, the blade can define a leading edge 136 having one or more sharpened portions. In a more particular embodiment, the leading edge 136 can be sharp along a majority of an exposed length, L, thereof. For instance, at least 51% of the leading edge 136 can be sharp, such as at least 55% of the leading edge can be sharp, such as at least 60% of the leading edge can be sharp, such as at least 65% of the leading edge can be sharp, such as at least 70% of the leading edge can be sharp, such as at least 75% of the leading edge can be sharp, such as at least 80% of the leading edge can be sharp, such as at least 85% of the leading edge can be sharp, such as at least 90% of the leading edge can be sharp, such as at least 95% of the leading edge can be sharp, such as at least 99% of the leading edge can be sharp. In certain instances, the leading edge 136 can define a serrated edge. In other instances, the leading edge 136 can define a plain edge having one or more bevels. In yet further instances, the leading edge 136 can define one or more portions having serrations and one or more other portions having plain edges.

In an embodiment, the blade can have a straight profile along its length, L, as seen from a top view (FIGS. 1 and 2). In other embodiments, the blade can have a curved, polygonal, or otherwise non-straight profile along its length, L, as seen from a top view (e.g., FIGS. 6 and 7).

The trimmer line can include, for example, monofilament line. An exemplary material includes nylon. The nylon can be reinforced or nonreinforced. The trimmer line can define a thickness, i.e., diameter, in a range of approximately 0.05 inches and approximately 0.15 inches. The shape of the trimmer line may be determined by the trimming operation to be performed. Exemplary shapes include round cross-sections, twisted cross-sections, square (or otherwise polygonal) cross-sections, star shaped cross-sections, and serrated cross sections.

Referring again to FIG. 1, the second selectively deployable cutting tool 134 can define a plurality of second selectively deployable cutting tools, such as 134A and 134B. The plurality of second selectively deployable cutting tools 134A and 134B can extend radially outward from the rotatable body 130 so as to form a cutting diameter when rotated. In an embodiment, the plurality of second selectively deployable cutting tools 134A and 134B can be disposed at generally opposite sides of the rotatable body 130. In such a manner, wobble of the tool head 104 induced by eccentric loading at high RPMs can be reduced. It should be understood that the number of second selectively deployable cutting tools 134 can be greater than two as illustrated, however, in a particular embodiment, the plurality of second selectively deployable cutting tools 134 can be arranged so as to minimize wobble of the tool head 104 at high RPMs.

Figure 3:
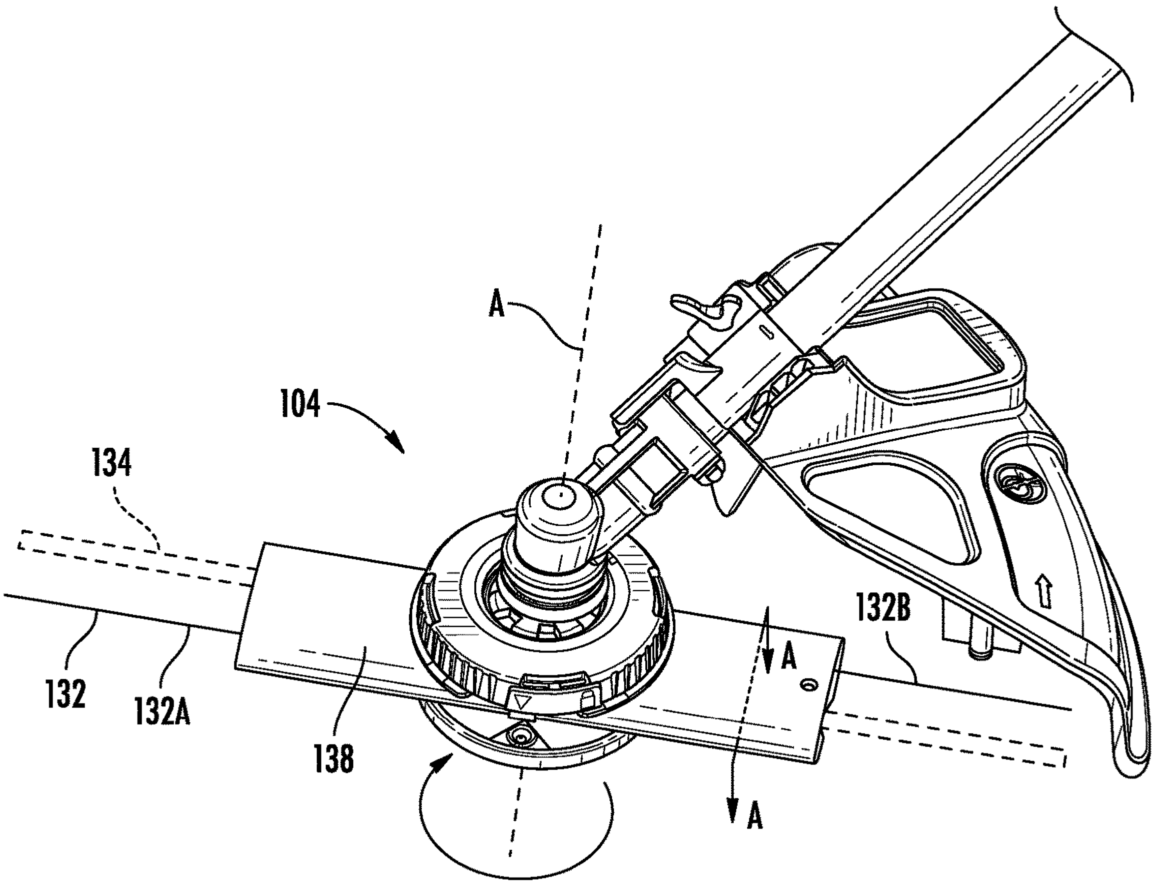
FIG. 3 is an enlarged perspective view of a portion of the power tool in accordance with an exemplary embodiment of the present disclosure.

Similarly, as shown in FIG. 3 the first selectively deployable cutting tool 132 can define a plurality of first selectively deployable cutting tools, such as 132A and 132B. The plurality of first selectively deployable cutting tools 132A and 132B can extend radially outward from the rotatable body 130 so as to form a cutting diameter when rotated. In an embodiment, the plurality of first selectively deployable cutting tools 132A and 132B can be disposed at generally opposite sides of the rotatable body 130. In such a manner, wobble of the tool head 104 induced by eccentric loading at high RPMs can be reduced. It should be understood that the number of first selectively deployable cutting tools 132 can be greater than two as illustrated, however, in a particular embodiment, the plurality of first selectively deployable cutting tools 132 can be arranged so as to minimize wobble of the tool head 104 at high RPMs.

In an embodiment, the number of first selectively deployable cutting tools 132 can be equal to the number of second selectively deployable cutting tools 134. In a particular embodiment, the tool head 104 can include two first selectively deployable cutting tools 132 and two second selectively deployable cutting tools 134. In another embodiment, the power tool 100 can include a different number of first and second selectively deployable cutting tools 132 and 134.

In certain instances, the rotatable body 130 can include a multi-piece construction. Referring to FIG. 2, the rotatable body 130 can include an upper portion 130A and a lower portion 130B. The upper and lower portions 130A and 130B can be spaced apart from one another. In an embodiment, the upper and lower portions 130A and 130B can be disconnectable from one another such that the operator can access an area therebetween.

The tool head 104 can further include a housing 138 from which the first and second selectively deployable cutting tools 132 and 134 extend from when deployed. The housing 138 can be disposed between the upper and lower portions 130A and 130B of the rotatable body 130 of the tool head 104. The housing 138 can define a longitudinal axis, $A_H$, that is parallel, or generally parallel, with a length of the first and/or second selectively deployable cutting tools 132 and 134, or a best fit line therewith. The housing 138 can define opposite ends from which the first and/or second selectively deployable cutting tools 132 and 134 can emerge when in use. When not in use, the first and/or second selectively deployable cutting tools 132 and 134 can be at least partially stowed within the housing 138.

As shown, in use only one of the first and second selectively deployable cutting tools 132 and 134 is actively deployed, i.e., extends from the housing 138, at a time. That is, the power tool 100 is not generally used with both the first and second selectively deployable cutting tools 132 and 134 simultaneously exposed. In certain instances, it may be desirable to use the first selectively deployable cutting tool 132 at one end of the housing 138 and the second selectively deployable cutting tool 134 at the other end of the housing 138, however, while possible in accordance with certain embodiments, dual use of the first and second selectively deployable cutting tools 132 and 134 at a same end of the housing 138 is generally not desirable as the cutting tools may interfere with one another. Additionally, as described below, in accordance with certain embodiments, simultaneous use of the first and second selectively deployable cutting tools 132 and 134 may not be possible.

As noted above, FIG. 3 illustrates a view of the tool head 104 with the first selectively deployable cutting tool 132 extending from the housing 138. In this configuration, the second selectively deployable cutting tool 134 is stowed in the housing 138, i.e., not generally visible from the outside. However, the second selectively deployable cutting tool 134 is represented in dashed lines as it would appear in the deployed position. As shown, the first and second selectively deployable cutting tools 132 and 134 can be rotationally symmetrical about the axis of rotation A without being reflectively symmetrical.

Figure 4:
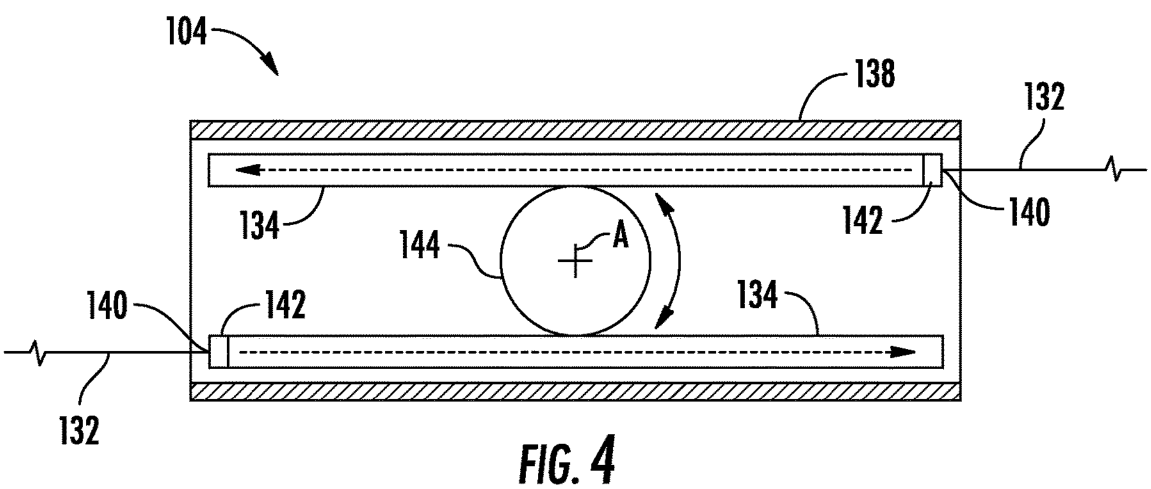
FIG. 4 is a cross-sectional view of a portion of the power tool as seen along Line A-A in FIG. 3 in accordance with an exemplary embodiment of the present disclosure in a first operational mode.

FIG. 4 illustrates a schematic cross-sectional view of the tool head 104 as seen along Line A-A in FIG. 3 when the first selectively deployable cutting tool 132 is deployed and the second selectively deployable cutting tool 134 is stowed. As illustrated, the first and second selectively deployable cutting tools 132 and 134 are coupled together at an interface 140. In the illustrated embodiment, the first and second selectively deployable cutting tools 132 and 134 are directed coupled together. In another embodiment, the first and second selectively deployable cutting tools 132 and 134 can be coupled together through a support member. The support member can include a discrete component or a portion 142 of either/both of the first and second selectively deployable cutting tools 132 and 134. By way of example, where the first selectively deployable cutting tool 132 comprises trimmer line and the second selectively deployable cutting tool 134 comprises a blade, the portion 142 can be part of the blade and include an opening through which the trimmer line is fed. As shown in FIG. 4, in embodiments having a plurality of first selectively deployable cutting tools 132 and a plurality of second selectively deployable cutting tools 134, the tool head 104 can include a plurality of support members, e.g., a plurality of portions 142.

The tool head 104 can include a mesh assembly 144 configured to control deployment of the first and second selectively deployable cutting tools 132 and 134. The mesh assembly 144 can include a gear assembly including one or more gears, e.g., one or more rack gears and/or pivot gears. When the tool head 104 spins counter-wise, the mesh assembly 144 can permit egress of the first selectively deployable cutting tool(s) 132 from the housing 138. Conversely, when the tool head 104 spins clockwise, the mesh assembly 144 can permit egress of the second selectively deployable cutting tool(s) 134 from the housing 138. As shown in FIG. 4, the tool head 104 is spinning in a counter-clockwise direction.

Figure 5:
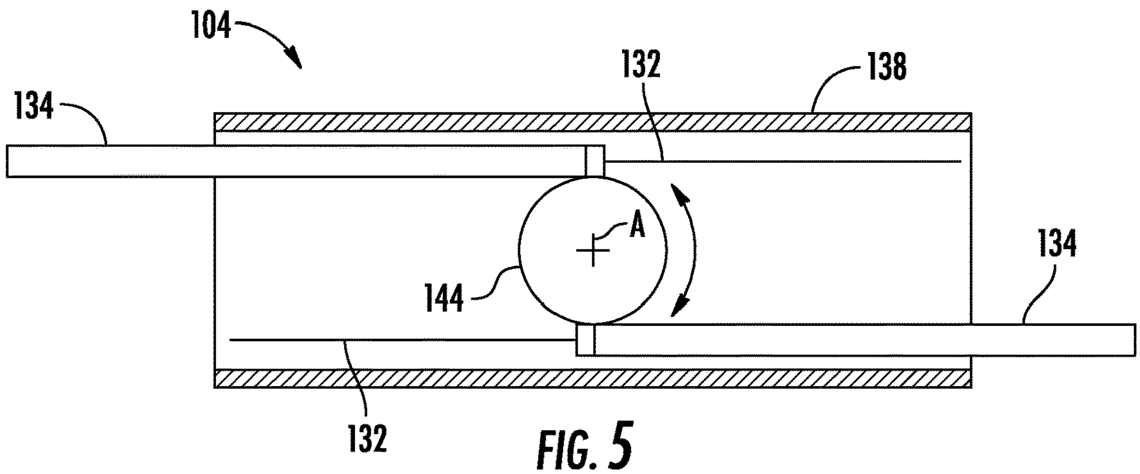
FIG. 5 is a cross-sectional view of a portion of the power tool as seen along Line A-A in FIG. 3 in accordance with an exemplary embodiment of the present disclosure in a second operational mode.

When the tool head 104 reverses direction and spins in a clockwise direction, the second selectively deployable cutting tool(s) 134 can move along arrow 146 so as to deploy. FIG. 5 depicts the tool head 104 after the second selectively deployable cutting tool(s) 134 are deployed. As shown, the first selectively deployable cutting tool(s) 132 become stowed when the tool head 104 spins in the clockwise direction. The tool head 104 can include one or more stop features (not shown) configured to prevent ejection of the cutting tools from the housing 138.

Referring again to FIG. 4, the first selectively deployable cutting tool 132 can define a first projection distance, as measured by a length of the first selectively deployable cutting tool extending beyond the housing 138 of the tool head. Referring to FIG. 5, the second selectively deployable cutting tool 134 can define a second projection distance, as measured by a length of the second selectively deployable cutting tool extending beyond the housing 138. The effective cutting distance of the tool head 138 can correspond with the maximum cutting area the tool head 104 can cut without moving the tool head 104 laterally. In an embodiment, the effective cutting distance of the tool head 138 can be measured by a sum of the first and second projecting distances. In a more particular embodiment, the effective cutting distance of the tool head 104 can remain generally constant when using the tool head 104 in the first and second rotational directions, i.e., clockwise and counter-clockwise.

Figure 6:
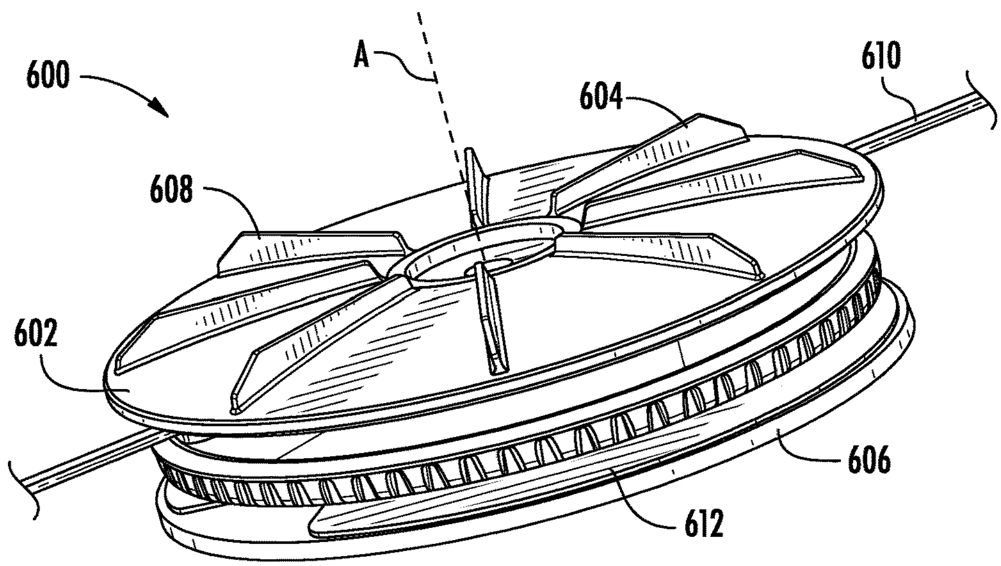
FIG. 6 is a perspective view of a tool head of a power tool in accordance with an exemplary embodiment of the present disclosure in a first operational mode.
Figure 7:
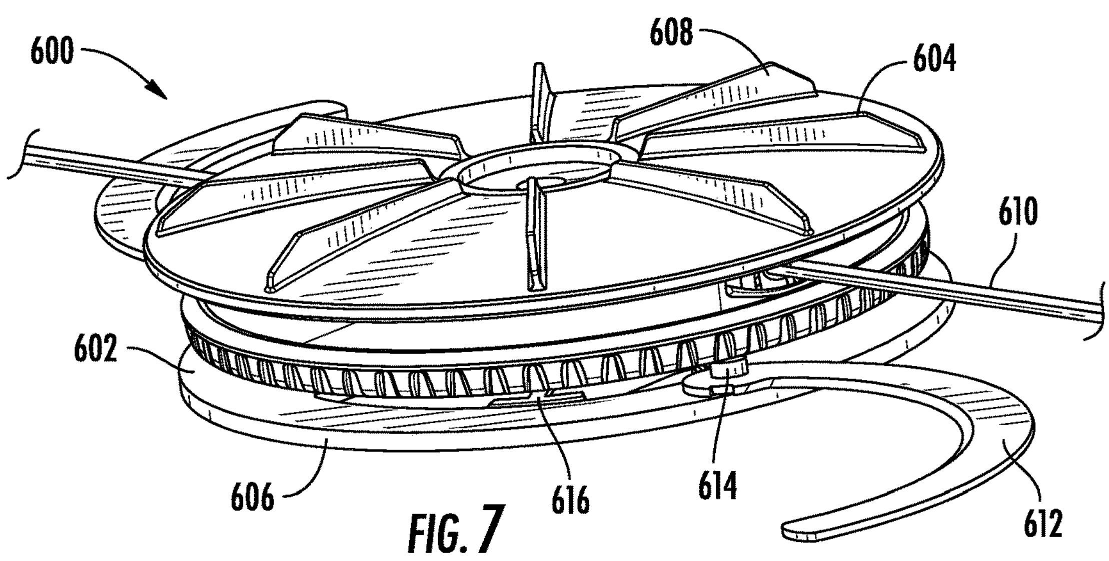
FIG. 7 is a perspective view of the tool head in accordance with an exemplary embodiment of the present disclosure in a second operational mode.

FIGS. 6 and 7 illustrate a tool head 600 of the power tool 100 in accordance with another embodiment. The tool head 600 can include a rotatable body 602. The rotatable body 602 and rotatable body 130 can have any number of similar characteristics and/or features as compared to one another. For example, in an embodiment, the rotatable body 602 can include an upper portion 604 and a lower portion 606. The upper and lower portions 604 and 606 can be configured to be separated from one another to allow access to a space defined therebetween. In an embodiment, at least one of the upper and lower portions 604 and 606 can include one or more fins, such as fins 608. The fins 608 can extend radially from an axis of rotation A toward a radially outer edge 610 of the tool head 600. In certain instances, the fins 608 can extend in a circumferential direction in addition to, or instead of, the aforementioned radial direction. In an embodiment, the fins 608 can provide a supply (flow) of cooling air to another portion of the power tool 100. For instance, where the tool head 600 is directly coupled to a motor, the fins 608 can generate a supply of cooling air towards or away from the motor so as to maintain the motor within a prescribed temperature range under loading conditions. The fins 608 may prevent buildup of debris, e.g., clippings or brush cuttings, within the power tool 100.

The tool head 600 can include a first selectively deployable cutting tool 610 and a second selectively deployable cutting tool 612. As illustrated in FIG. 6, the first selectively deployable cutting tool 610 can be deployed and the second selectively deployable cutting tool 612 can remain in a stowed position when the tool head 600 is rotated in a first rotational direction. The first selectively deployable cutting tool 610 can include, for example, trimmer line used for trimming grass while the second selectively deployable cutting tool 612 can include, for example, a blade for cutting brush. As illustrated in FIG. 7, the first selectively deployable cutting tool 610 can be stowed and the second selectively deployable cutting tool 612 can be deployed when the tool head 600 is rotated in a second rotational direction opposite the first rotational direction. Unlike the embodiment described with respect to FIGS. 1 through 5 where deployment of at least the second selectively deployable cutting tool 134 occurs through radial translation, in the embodiment illustrated in FIGS. 6 and 7, the second selectively deployable cutting tool 612 can occur through pivotal movement. By way of non-limiting example, the second selectively deployable cutting tool 612 can be coupled to the lower portion 606 of the rotatable body 602 through a pivot point 614. The pivot point 614 can include, for example, a hinge, a pin, or the like about which an inner end of the second selectively deployable cutting tool 612 can pivot.

In an embodiment, the second selectively deployable cutting tool 612 can be maintained in the stowed position by one or more securing elements, such as a spring-loaded lock 616. The spring-loaded lock 616 can include a retaining element (not shown) configured to retain the second selectively deployable cutting tool 612 in the stowed position until a force displaces the retaining element from blocking the release of the second selectively deployable cutting tool 612. In an embodiment, the displacement force required to release the retaining element may be determined at least in part by a spring constant of a spring biasing the retaining element. Therefore, selection of the displacement force can be determined at least in part by the selection of a spring having a desirable spring constant.

Figure 8:
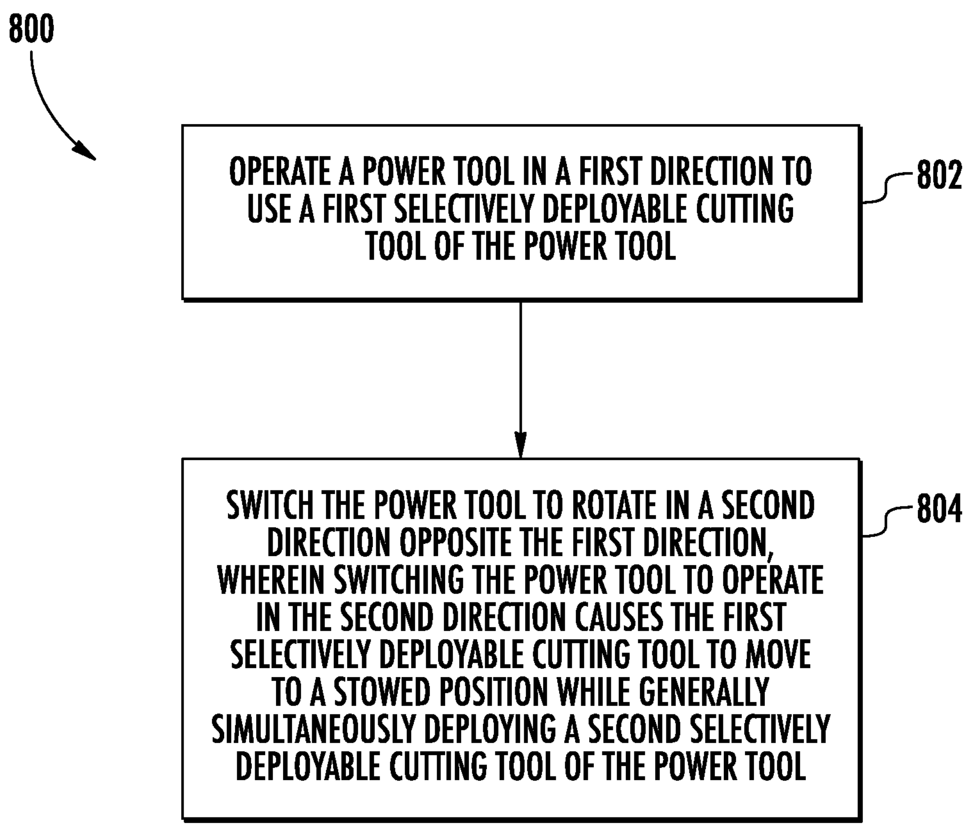
FIG. 8 is a flow chart of a method of performing outdoor work in accordance with an exemplary embodiment of the present disclosure.

FIG. 8 illustrates an exemplary embodiment of a method 800 of performing outdoor work. The method 800 includes a step 802 of operating the power tool in a first direction to use a first selectively deployable cutting tool. The step 802 can be performed at a fixed velocity, at one or more preset velocities, or through variable velocity controlled by selective activation of one or more triggers of the power tool. The method 800 can further include a step 804 of switching the power tool to rotate in a second direction opposite the first direction. The step 804 can cause the first selectively deployable cutting tool to move to a stowed position while generally simultaneously deploying a second selectively deployable cutting tool of the power tool.

The first and second selectively deployable cutting tools can be disposed on opposite ends of a first support member and switching the power tool to operate in the second direction causes the first support member to translate generally radially with respect to an axis of rotation of a tool head of the power tool such that a first projection distance of the first selectively deployable cutting tool decreases while a second projection distance of the second selectively deployable cutting tool increases by an inverse amount.

Further aspects of the invention are provided by the subject matter of the following clauses:

Embodiment 1. A dual function tool head comprising: a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

Embodiment 2. The dual function tool head of any one or more of the embodiments, wherein the first selectively deployable cutting tool defines a first projection distance, as measured by a length of the first selectively deployable cutting tool extending beyond a housing of the tool head, wherein the second selectively deployable cutting tool defines a second projection distance, as measured by a length of the second selectively deployable cutting tool extending beyond the housing, and wherein an effective cutting distance of the tool head, as measured by a sum of the first and second projection distances, is configured to remain generally constant when using the tool head in the first and second rotational directions.

Embodiment 3. The dual function tool head of any one or more of the embodiments, wherein the tool head is configured to operably rotate in the first direction and the second direction at generally equal or variable rotational velocities.

Embodiment 4. The dual function tool head of any one or more of the embodiments, wherein automatic deployment of the first or second selectively deployable cutting tool is configured to occur at velocities over a threshold deployment velocity, and wherein the threshold deployment velocity is at least 200 revolutions per minute (RPM).

Embodiment 5. The dual function tool head of any one or more of the embodiments, wherein the first selectively deployable cutting tool comprises trimmer line, and wherein the second selectively deployable cutting tool comprises a blade.

Embodiment 6. The dual function tool head of any one or more of the embodiments, wherein the trimmer line and blade are coupled together through a first support member, the first support member extending through a housing of the tool head and configured to translate radially relative to an axis of rotation of the tool head.

Embodiment 7. The dual function tool head of any one or more of the embodiments, wherein the first selectively deployable cutting tool comprises a plurality of first selectively deployable cutting tools, and wherein the second selectively deployable cutting tool comprises a plurality of second selectively deployable cutting tools.

Embodiment 8. The dual function tool head of any one or more of the embodiments, wherein the second selectively deployable cutting tool is held in a stowed position by a spring-loaded lock, the spring-loaded lock defining a release pressure above which the second deployable cutting tool is automatically deployed.

Embodiment 9. The dual function tool head of any one or more of the embodiments, wherein the first and second selectively deployable cutting tools are coupled to a gear assembly, the gear assembly comprising a rack gear or a pivot gear.

Embodiment 10. A dual function power tool comprising: a handle; an electric motor; a battery configured to provide power to the electric motor; and a dual function tool head rotatably driven by the electric motor, the tool head comprising: a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

Embodiment 11. The power tool of any one or more of the embodiments, wherein the power tool further comprises a user interface element configured to selectively change the tool head between the first and second rotational directions.

Embodiment 12. The power tool of any one or more of the embodiments, wherein the tool head is configured to operably rotate in the first direction and the second direction at generally equal rotational velocities.

Embodiment 13. The power tool of any one or more of the embodiments, wherein the first and second selectively deployable cutting tools are coupled to a gear assembly, the gear assembly comprising a rack gear or a pivot gear.

Embodiment 14. The power tool of any one or more of the embodiments, wherein the second selectively deployable cutting tool is held in a stowed position by a spring-loaded lock, the spring-loaded lock defining a release pressure above which the second deployable cutting tool is automatically deployed.

Embodiment 15. The power tool of any one or more of the embodiments, wherein the first selectively deployable cutting tool defines a first projection distance, as measured by a length of the first selectively deployable cutting tool extending beyond a housing of the tool head, wherein the second selectively deployable cutting tool defines a second projection distance, as measured by a length of the second selectively deployable cutting tool extending beyond the housing, and wherein an effective cutting distance of the tool head, as measured by a sum of the first and second projection distances, is configured to remain generally constant when using the tool head in the first and second rotational directions.

Embodiment 16. A method of performing outdoor work, the method comprising: operating a power tool in a first direction to use a first selectively deployable cutting tool of the power tool; and switching the power tool to rotate in a second direction opposite the first direction, wherein switching the power tool to operate in the second direction causes the first selectively deployable cutting tool to move to a stowed position while generally simultaneously deploying a second selectively deployable cutting tool of the power tool.

Embodiment 17. The method of any one or more of the embodiments, wherein the first and second selectively deployable cutting tools are disposed on opposite ends of a first support member, and wherein switching the power tool to operate in the second direction causes the first support member to translate generally radially with respect to an axis of rotation of a tool head of the power tool such that a first projection distance of the first selectively deployable cutting tool decreases while a second projection distance of the second selectively deployable cutting tool increases by an inverse amount.

Embodiment 18. The method of any one or more of the embodiments, wherein the first selectively deployable cutting tool comprises a trimmer line, and wherein the second selectively deployable cutting tool comprises a blade.

Embodiment 19. The method of any one or more of the embodiments, wherein the second deployable cutting tool is automatically deployed upon reaching a threshold deployment velocity in the second rotational direction, and wherein the threshold deployment velocity is at least 200 revolutions per minute (RPM).

Embodiment 20. The method of any one or more of the embodiments, wherein switching the power tool to rotate in a second direction comprises toggling a user interface element of the power tool between a first position and a second position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dual function tool head comprising:

a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

2. The dual function tool head of claim 1, wherein the first selectively deployable cutting tool defines a first projection distance, as measured by a length of the first selectively deployable cutting tool extending beyond a housing of the tool head, wherein the second selectively deployable cutting tool defines a second projection distance, as measured by a length of the second selectively deployable cutting tool extending beyond the housing, and wherein an effective cutting distance of the tool head, as measured by a sum of the first and second projection distances, is configured to remain generally constant when using the tool head in the first and second rotational directions.

3. The dual function tool head of claim 1, wherein the tool head is configured to operably rotate in the first direction and the second direction at generally equal or variable rotational velocities.

4. The dual function tool head of claim 1, wherein automatic deployment of the first or second selectively deployable cutting tool is configured to occur at velocities over a threshold deployment velocity, and wherein the threshold deployment velocity is at least 200 revolutions per minute (RPM).

5. The dual function tool head of claim 1, wherein the first selectively deployable cutting tool comprises trimmer line, and wherein the second selectively deployable cutting tool comprises a blade.

6. The dual function tool head of claim 5, wherein the trimmer line and blade are coupled together through a first support member, the first support member extending through a housing of the tool head and configured to translate radially relative to an axis of rotation of the tool head.

7. The dual function tool head of claim 1, wherein the first selectively deployable cutting tool comprises a plurality of first selectively deployable cutting tools, and wherein the second selectively deployable cutting tool comprises a plurality of second selectively deployable cutting tools.

8. The dual function tool head of claim 1, wherein the second selectively deployable cutting tool is held in a stowed position by a spring-loaded lock, the spring-loaded lock defining a release pressure above which the second deployable cutting tool is automatically deployed.

9. The dual function tool head of claim 1, wherein the first and second selectively deployable cutting tools are coupled to a gear assembly, the gear assembly comprising a rack gear or a pivot gear.

10. A dual function power tool comprising:

a handle;

an electric motor;

a battery configured to provide power to the electric motor; and a dual function tool head rotatably driven by the electric motor, the tool head comprising:

a first selectively deployable cutting tool configured to automatically deploy when the tool head rotates in a first direction and automatically move to a stowed position when the tool head rotates in a second direction opposite the first direction; and a second selectively deployable cutting tool configured to automatically deploy when the tool head rotates in the second direction and automatically moved to a stowed position when the tool head rotates in the first direction.

11. The power tool of claim 10, wherein the power tool further comprises a user interface element configured to selectively change the tool head between the first and second rotational directions.

12. The power tool of claim 10, wherein the tool head is configured to operably rotate in the first direction and the second direction at generally equal rotational velocities.

13. The power tool of claim 10, wherein the first and second selectively deployable cutting tools are coupled to a gear assembly, the gear assembly comprising a rack gear or a pivot gear.

14. The power tool of claim 10, wherein the second selectively deployable cutting tool is held in a stowed position by a spring-loaded lock, the spring-loaded lock defining a release pressure above which the second deployable cutting tool is automatically deployed.

15. The power tool of claim 10, wherein the first selectively deployable cutting tool defines a first projection distance, as measured by a length of the first selectively deployable cutting tool extending beyond a housing of the tool head, wherein the second selectively deployable cutting tool defines a second projection distance, as measured by a length of the second selectively deployable cutting tool extending beyond the housing, and wherein an effective cutting distance of the tool head, as measured by a sum of the first and second projection distances, is configured to remain generally constant when using the tool head in the first and second rotational directions.

16. A method of performing outdoor work, the method comprising:

operating a power tool in a first direction to use a first selectively deployable cutting tool of the power tool; and switching the power tool to rotate in a second direction opposite the first direction, wherein switching the power tool to operate in the second direction causes the first selectively deployable cutting tool to move to a stowed position while generally simultaneously deploying a second selectively deployable cutting tool of the power tool.

17. The method of claim 16, wherein the first and second selectively deployable cutting tools are disposed on opposite ends of a first support member, and wherein switching the power tool to operate in the second direction causes the first support member to translate generally radially with respect to an axis of rotation of a tool head of the power tool such that a first projection distance of the first selectively deployable cutting tool decreases while a second projection distance of the second selectively deployable cutting tool increases by an inverse amount.

18. The method of claim 16, wherein the first selectively deployable cutting tool comprises a trimmer line, and wherein the second selectively deployable cutting tool comprises a blade.

19. The method of claim 16, wherein the second deployable cutting tool is automatically deployed upon reaching a threshold deployment velocity in the second rotational direction, and wherein the threshold deployment velocity is at least 200 revolutions per minute (RPM).

20. The method of claim 16, wherein switching the power tool to rotate in a second direction comprises toggling a user interface element of the power tool between a first position and a second position.

* * * * *